United States Patent
Yoshida (10) Patent No.: US 9,825,451 B2
(45) Date of Patent: Nov. 21, 2017

(54) APPARATUS FOR LEADING OUT CABLE FROM HOUSING OF ELECTRONIC APPARATUS AND SUCH ELECTRONIC DEVICE

(71) Applicant: FANUC CORPORATION, Yamanashi (JP)

(72) Inventor: Hirosato Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/006,515

(22) Filed: Jan. 26, 2016

(65) Prior Publication Data
US 2016/0226234 A1    Aug. 4, 2016

(30) Foreign Application Priority Data

Jan. 30, 2015  (JP) ................. 2015-017727

(51) Int. Cl.
*H02G 15/013* (2006.01)
*H02G 3/08* (2006.01)

(52) U.S. Cl.
CPC .......... *H02G 15/013* (2013.01); *H02G 3/083* (2013.01); *H02G 3/088* (2013.01)

(58) Field of Classification Search
CPC .......... H02G 3/083; H02G 3/22; H02G 15/04; H02G 15/046; H02G 15/013; H01B 17/26
USPC ............... 174/660, 663, 650, 665, 659, 668
See application file for complete search history.

(56) References Cited

U.S. PATENT DOCUMENTS

| | | | |
|---|---|---|---|
| 5,220,132 A * | 6/1993 | Macey .............. | H02G 15/04 174/658 |
| 6,248,953 B1 * | 6/2001 | Miller ............... | H02G 15/013 174/74 R |
| 2014/0167411 A1 * | 6/2014 | Kimbrell ............ | H02G 9/02 285/351 |

(Continued)

FOREIGN PATENT DOCUMENTS

| JP | 6230386 U | 2/1987 |
|---|---|---|
| JP | 2001195941 A | 7/2001 |

(Continued)

OTHER PUBLICATIONS

English Abstract and Machine Translation for Japanese Publication No. 2011239530, published Nov. 24, 2011, 9 pages.

(Continued)

*Primary Examiner* — Hoa C Nguyen
*Assistant Examiner* — Amol Patel
(74) *Attorney, Agent, or Firm* — Fredrikson & Byron, P.A.

(57) ABSTRACT

The apparatus 50 comprises a flange 52 which is fastened to a housing 12, a cable clamp 54 which has a first through hole through which the cable 14 is passed and which is arranged between the housing 12 and the flange 52, and an elastic member 56 which has a second through hole through which the cable 14 is passed and which is arranged between the housing 12 and the cable clamp 54. The flange 2 has a cable hole 66 which opens at an outer peripheral edge of the flange 52 and holds the cable 14. The elastic member 56 is sandwiched between the cable clamp 54 and the housing 12 when the flange 52 is fastened to the housing 12, elastically deforms, holds the cable 14 at the inside of the second through hole, and seals the cable lead-out hole 66.

5 Claims, 13 Drawing Sheets

(56) References Cited

U.S. PATENT DOCUMENTS

2015/0308672 A1* 10/2015 Chien ................... F21V 25/12
362/457

FOREIGN PATENT DOCUMENTS

| | | | |
|---|---|---|---|
| JP | 2011239530 A | 11/2001 |
| JP | 2011239530 A | 11/2011 |
| JP | 2012243860 A | 12/2012 |
| JP | 2013105965 A | 5/2013 |

OTHER PUBLICATIONS

English Abstract and Machine Translation for Japanese Publication No. 2001-195941 A, published Jul. 19, 2001, 9 pgs.
English Abstract and Machine Translation for Japanese Publication No. 2011-239530 A, published Nov. 24, 2011, 9 pgs.
English Abstract and Machine Translation for Japanese Publication No. 2012-243860 A, published Dec. 10, 2012, 11 pgs.
English Abstract and Machine Translation for Japanese Publication No. 2013-105965 A, published May 30, 2013, 11 pgs.
English Machine Translation for Japanese Publication No. 62-030386, U published Feb. 24, 1987, 5 pgs.

* cited by examiner

APPARATUS FOR LEADING OUT CABLE FROM HOUSING OF ELECTRONIC APPARATUS AND SUCH ELECTRONIC DEVICE

BACKGROUND OF THE INVENTION

1. Field of the Invention

The invention relates to an apparatus for leading out a cable from a housing of an electronic device and to an electronic device which is provided with such an apparatus.

2. Description of the Related Art

Known in the art are various apparatus for sealing a cable lead-out hole formed in a housing of an electronic device while leading out a cable from that cable lead-out hole (for example, Japanese Patent Publication No. 2001-195941A, Japanese Patent Publication No. 2011-239530A, and Japanese Patent Publication No. 2012-243860A).

SUMMARY OF INVENTION

In such an apparatus, in addition to securing air-tightness of the inside of the housing, ease of attachment of the apparatus, reduction of the number of parts, etc. are being sought.

In one aspect of the invention, an apparatus for leading out a cable from a cable lead-out hole formed at a housing of an electronic device while sealing the cable lead-out hole, comprises a flange fastened to the housing; a cable clamp arranged between the housing and flange, and includes a first through hole into which the cable is inserted; and an elastic member arranged between the housing and cable clamp, and includes a second through hole into which the cable is inserted.

The flange includes a cable hole which opens at the outer peripheral edge of the flange and which receives the cable. When the flange is fastened to the housing, the elastic member is sandwiched between the cable clamp and housing, and elastically deforms so as to narrow the second through hole, thereby the elastic member holds the cable in the second through hole and seals the cable lead-out hole.

The cable clamp may be divided into a plurality of segments. Each of the plurality of segments may have a surface which forms a part of a wall surface which defines the first through hole. The flange includes a first recess which is formed to be recessed inward from an end face which faces the housing and which holds the cable clamp.

The flange may further include a projection which projects out from an end face which faces the housing toward the housing. The projection may be configured to be fit into the second cable lead-out hole, which is formed at the housing so as to adjoin the cable lead-out hole, when the flange is fastened to the housing.

In another aspect of the invention, an electronic device comprises a housing which houses an electronic component inside thereof and which includes a cable lead-out hole for leading out a cable, and the above-mentioned apparatus provide at the housing.

The cable lead-out hole may include a second recess formed to be recessed inward of the housing from a first end face of the housing which faces the flange, and a hole part extending from a bottom surface of the second recess to a second end face of the housing opposite the first end face. The elastic member may be received in the second recess.

DETAILED DESCRIPTION

Below, embodiments of the invention will be explained in detail based on the drawings. First, referring to FIG. 1 to FIG. 3, an electronic device 10 according to an embodiment of the invention will be explained. Note that, in the following explanation, directions are defined as indicated by the Cartesian coordinate system in the figures. Further, for convenience of explanation, the x-axis plus direction is referred as the front direction (frontward), the y-axis plus direction is referred as the right direction (rightward), and the z-axis plus direction is referred as the upper direction (upward).

Figure 1:
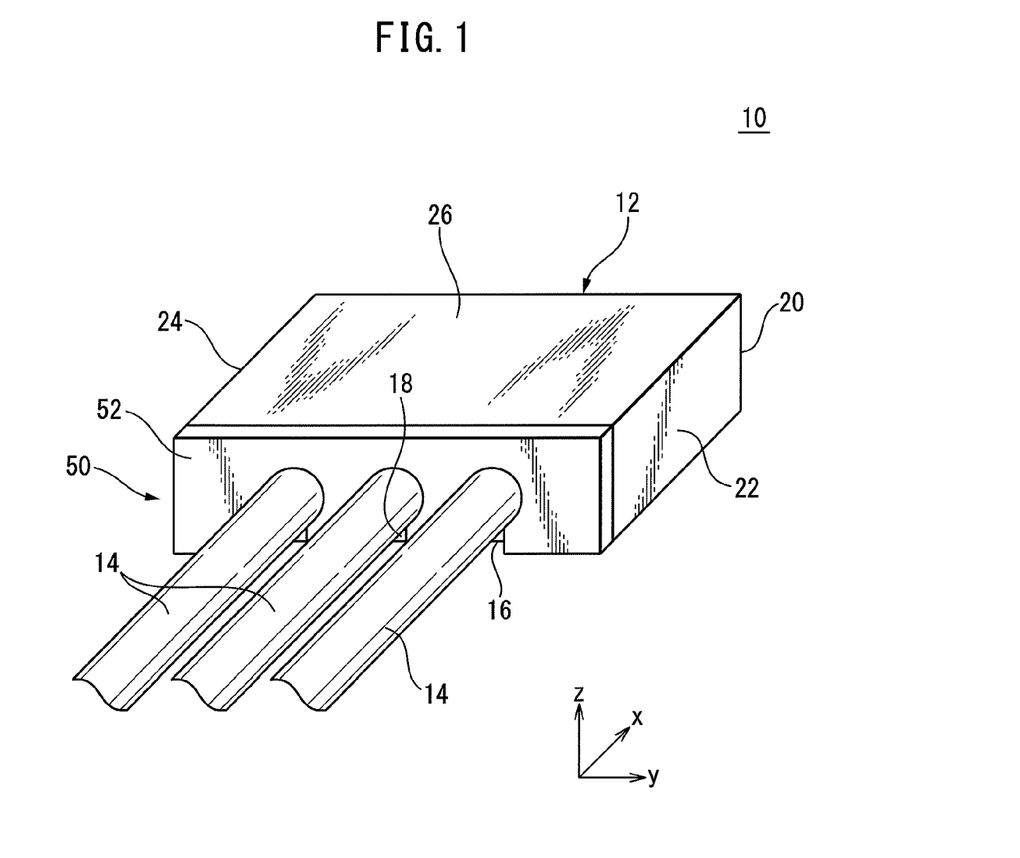
FIG. 1 is a view of an electronic device according to an embodiment of the invention.
Figure 2:
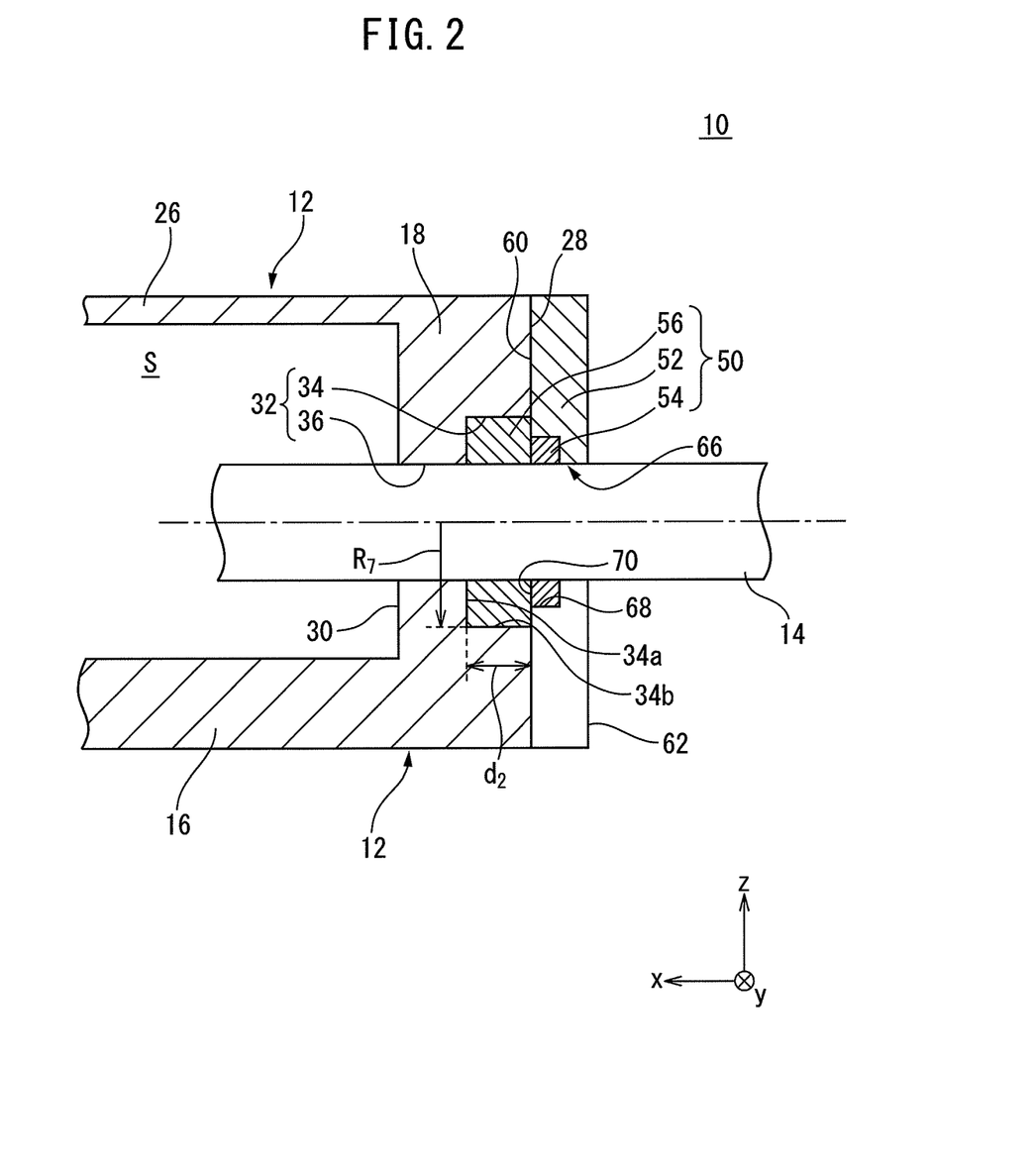
FIG. 2 is a cross-sectional view of the electronic device shown in FIG. 1 as seen from the left side when cut along the x-z plane in FIG. 1.
Figure 3:
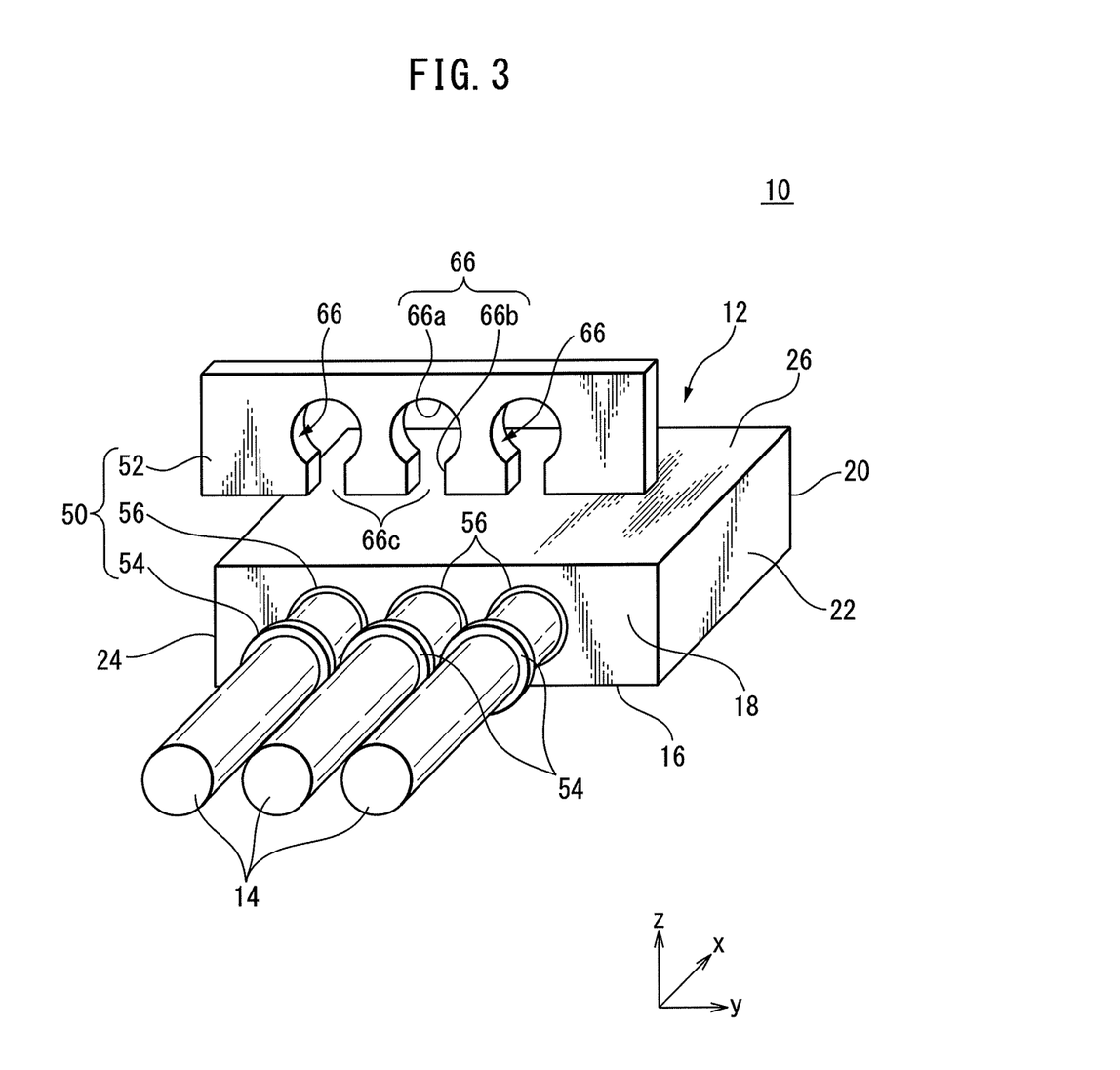
FIG. 3 is a disassembled view of the electronic device shown in FIG. 1.

The electronic device 10 is e.g. an encoder built in a servo motor of a robot or machine tool. The electronic device 10 includes a housing 12, electronic components (not shown) housed in the housing 12, cables 14 for electrically connecting the electronic components and an external device (not shown) installed outside of the housing 12, and an apparatus 50.

The housing 12 includes a bottom wall 16, a back wall 18 extending upward from a back edge of the bottom wall 16, a front wall 20 extending upward from a front edge of the bottom wall 16, a right wall 22 extending upward from a right edge of the bottom wall 16, a left wall 24 extending upward from a left edge of the bottom wall 16, and a top wall 26 opposite of the bottom wall 16.

These bottom wall 16, back wall 18, front wall 20, right wall 22, left wall 24, and top wall 26 define an inside space S in which the above-mentioned electronic components are housed. The back wall 18 is formed with cable lead-out holes 32 extending from the back surface 28 to the front surface 30 of the back wall 18.

Each of the cable lead-out hole 32 includes a recess 34 (second recess) formed to be recessed from the back surface 28 to the inside of the back wall 18, and a hole part 36 extending from the bottom surface 34a of the recess 34 to the front surface 30. The hole part 36 has a radius smaller than the recess 34.

In this embodiment, a total of three cable lead-out holes 32 are formed at the back wall 18 so as to align in the left-right direction, and a total of three cables 14 are led out through these cable lead-out holes 32 from the inside of the housing 12 to rear side.

The apparatus 50 is for leading out cables 14 from the cable lead-out holes 32 while sealing the cable lead-out holes 32. The apparatus 50 includes a flange 52, cable clamps 54, and elastic members 56.

The flange 52 is fastened to the back wall 18 by a fastener such as a bolt. Each of the cable clamps 54 is arranged between the back wall 18 and the flange 52. Further, each of the elastic members 56 is arranged between the back wall 18 (more specifically, the bottom surface 34a) and the cable clamp 54.

Figure 4A:
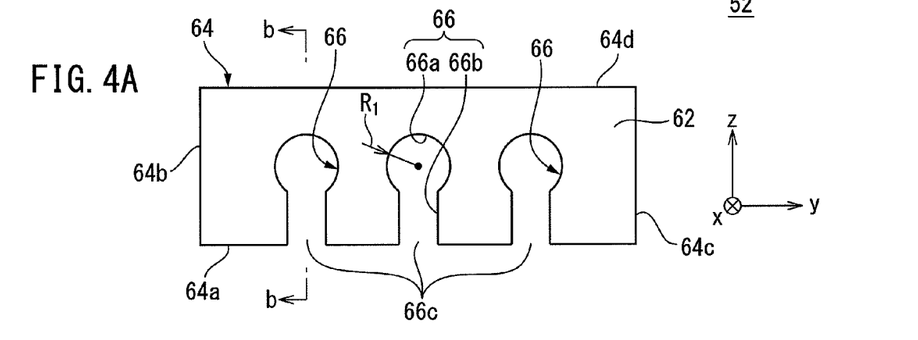
FIG. 4A is a view for explaining the flange shown in FIG. 1 as seen from the rear side of the flange.
Figure 4B:
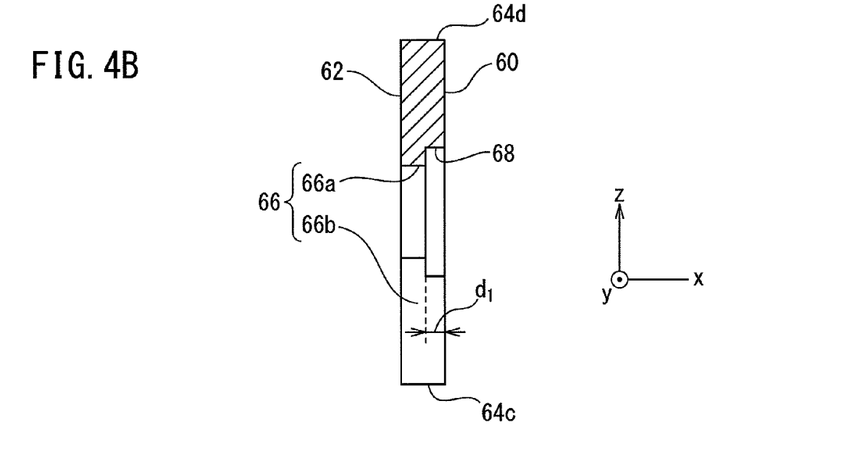
FIG. 4B is a cross-sectional view along b-b in FIG. 4A.
Figure 4C:
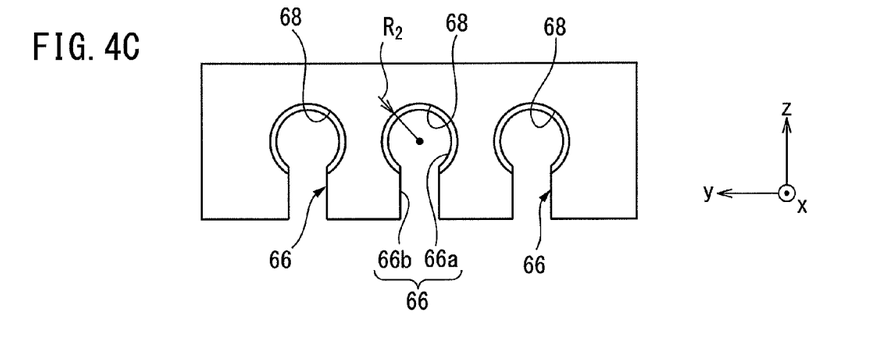
FIG. 4C is a view of the flange shown in FIG. 4A as seen from the front side.

Next, referring to FIG. 4A to FIG. 4c, the configuration of the flange 52 will be explained. The flange 52 is a substantially-rectangular plate member having a predetermined thickness in the front-rear direction. The flange 52 has a front surface 60, a back surface 62 opposite the front surface 60, and an outer circumferential surface (outer peripheral edge) 64 extending between the front surface 60 and the back surface 62 and extending over the circumference of the flange 52.

The outer circumferential surface 64 includes a bottom surface 64a extending in the left-right direction, a left surface 64b extending upward from the left edge of the bottom surface 64a, a right surface 64c extending upward from the right edge of the bottom surface 64a, and an upper surface 64d extending rightward from the left surface 64b to the right surface 64c so as to be opposite to the bottom surface 64a. The flange 52 is fastened to the housing 12 so that the front surface 60 thereof faces (specifically, contacts) the back surface 28 of the back wall 18 of the housing 12.

The flange 52 includes a total of three cable holes 66 arranged in the left-right direction at substantially equal intervals. Each of the cable holes 66 is formed to be recessed upward from the bottom surface 64a and extend from the front surface 60 to the back surface 62.

More specifically, each of the cable holes 66 includes a first hole part 66a and a second hole part 66b. The first hole part 66a is a substantially circular hole having a radius $R_1$ and is arranged at the center in the vertical direction of the flange 52. The second hole part 66b extends downward from the first hole part 66a so as to open to the outside at an open end 66c formed at the bottom surface 64a.

The flange 52 further includes recesses 68 (first recess) formed to be recessed from the front surface 60 to the inside of the flange 52. Each of the recess 68 is a substantially columnar-shaped recess which has a radius $R_2$ and which is formed to be substantially coaxial with each first hole part 66a. The radius $R_2$ is set to be larger than the radius $R_1$. Each of the recess 68 has a depth $d_1$ in the front-rear direction.

Figure 5:
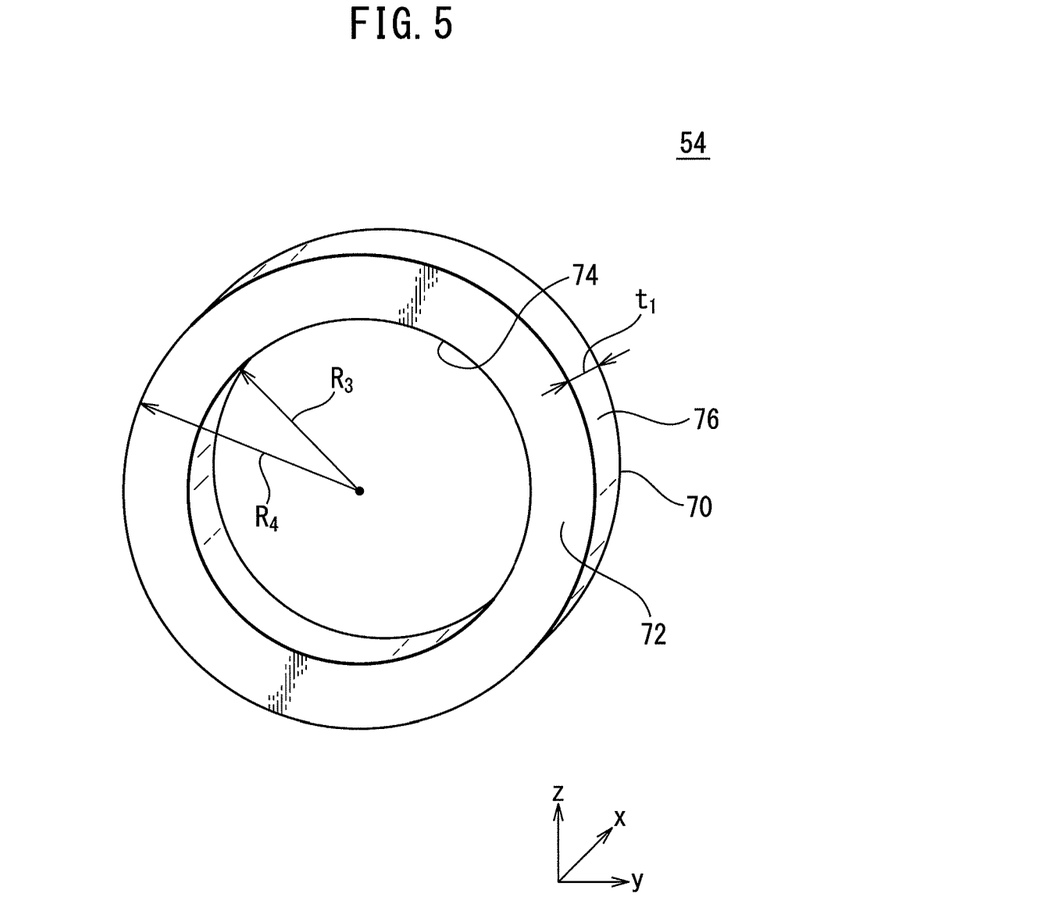
FIG. 5 is a view of the cable clamp shown in FIG. 3.

Next, referring to FIG. 5, the configuration of the cable clamps 54 will be explained. In this embodiment, each of the cable clamps 54 is a ring-shaped rigid member. More specifically, the cable clamp 54 has a front surface 70, a back surface 72 opposite the front surface 70, and inner and outer circumferential surfaces 74, 76 extending between the front surface 70 and the back surface 72.

The inner circumferential surface 74 is a cylindrical surface having a radius $R_3$. The inner circumferential surface 74 defines a through hole (first through hole) into which the cable 14 is inserted. As an example, the radius $R_3$ is set to be equal to or larger than the outer diameter of the cable 14. On the other hand, the outer circumferential surface 76 is a cylindrical surface having a radius $R_4$. As an example, the radius $R_4$ is set to be equal to or smaller than the radius $R_2$ of the recess 68.

The cable clamp 54 has a thickness $t_1$ in the front-rear direction. As an example, the thickness $t_1$ is set to be equal to or larger than the depth $d_1$ of the recess 68 formed at the flange 52.

Figure 6:
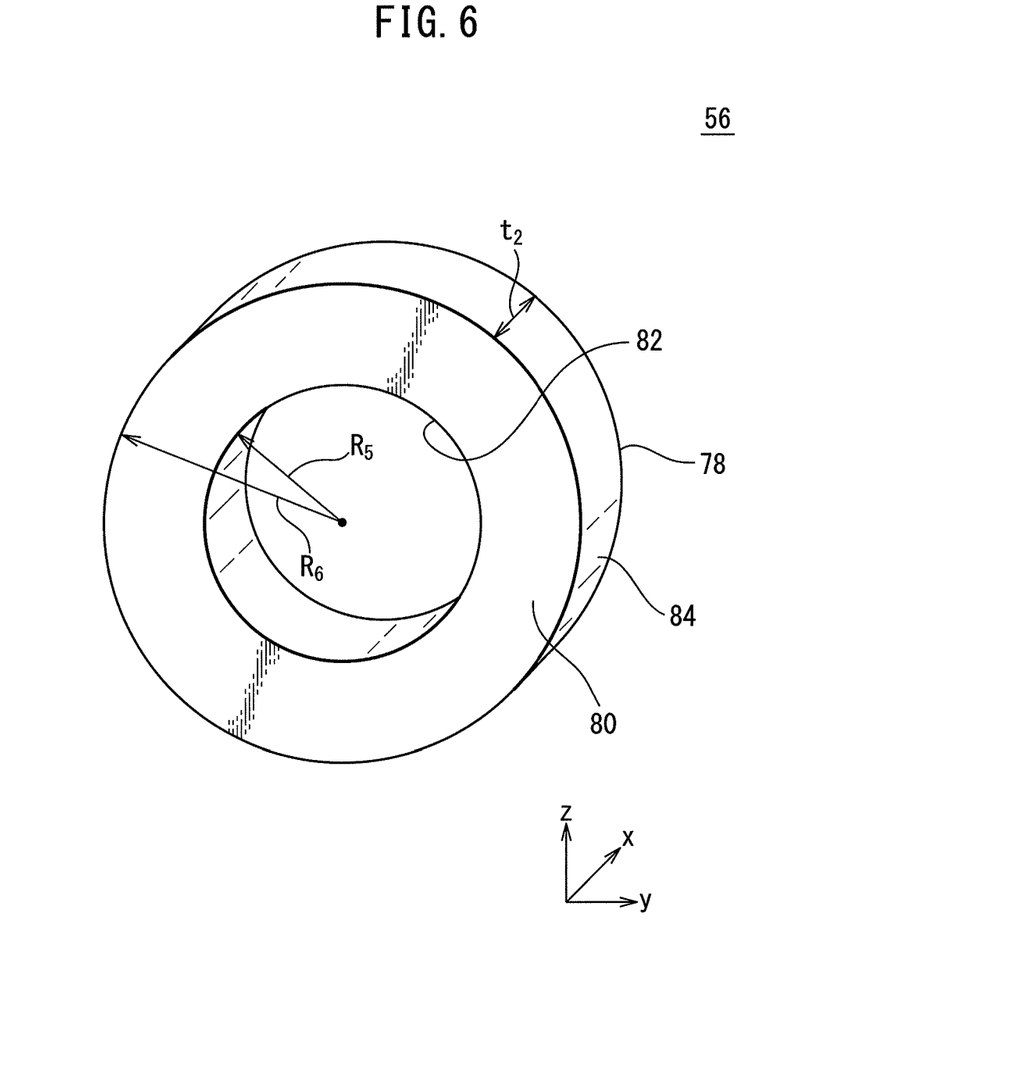
FIG. 6 is a view of the elastic member shown in FIG. 3.

Next, referring to FIG. 6, the configuration of the elastic members 56 will be explained. Each of the elastic members 56 is a ring-shaped member made of elastic material such as rubber. Specifically, the elastic member 56 has a front surface 78, a back surface 80 opposite the front surface 78, and inner and outer circumferential surfaces 82, 84 extending between the front surface 78 and the back surface 80.

The inner circumferential surface 82 is a cylindrical surface having a radius $R_5$. The inner circumferential surface 82 defines a through hole (second through hole) into which the cable 14 is inserted. As an example, the radius $R_5$ is set to be equal to or smaller than the outer diameter of the cable 14. On the other hand, the outer circumferential surface 84 is a cylindrical surface having a radius $R_6$. As an example, the radius $R_6$ is set to be equal to or larger than the radius $R_7$ (FIG. 2) of the recess 34 formed at the housing 12.

The elastic member 56 has a thickness $t_2$ in the front-rear direction. As an example, the thickness $t_2$ is set to be equal to or larger than the depth $d_2$ (FIG. 2) in the front-rear direction of the recess 34 formed at the back wall 18 of the housing 12.

Next, referring to FIG. 1 to FIG. 6, the attachment structure of the apparatus 50 will be explained. As shown in FIG. 3, the apparatus 50 according to this embodiment includes one flange 52, a total of three cable clamps 54, and a total of three elastic members 56. When mounting the apparatus to the housing 12, the user firstly fits each of the elastic members 56 over each of the cables 14, and fits it into the recess 34 formed at the back wall 18 of the housing 12.

Then, the user fits each of the cable clamps 54 over each of the cables 14, and arranges it at rear side of the elastic member 56. Then, the user places the flange 52 at rear side of the cable clamps 54, then inserts each cable 14 from each open end 66c formed at the flange 52 into each second hole part 66b, then fits it into each first hole part 66a.

Then, the user fastens the flange 52 to the back wall 18 of the housing 12 so that the cable clamps 54 are received in the recesses 68 of the flange 52. As a result, the apparatus 50 is mounted at the housing 12 as shown in FIG. 2.

When the flange 52 is fastened to the back wall 18 of the housing 12, the front surface 70 of the cable clamp 54 is pressed against the back surface 80 of the elastic member 56. Due to this, the elastic member 56 is sandwiched between the bottom surface 34a of the recess 34 and the front surface 70 of the cable clamp 54, thereby is compressed in the front-rear direction.

At this time, the elastic member 56 tends to expand in the radial direction thereof. However, since the outer circumferential surface 84 of the elastic member 56 contacts the inner circumferential surface 34b which defines the recess 34, the expansion of the elastic members 56 toward radially outside is restricted. Therefore, the elastic member 56 mainly expands toward radially inside so as to narrow the inner circumferential surface 82, thereby the diameter of the inner circumferential surface 82 is decreased. As a result, the inner circumferential surface 82 tightly contacts the outer circumferential surface of the cable 14, thereby the cable 14 is held by the inner circumferential surface 82.

On the other hand, the front surface 78 of the elastic member 56 tightly contacts the bottom surface 34a of the recess 34, and the outer circumferential surface 84 of the elastic member 56 tightly contacts the inner circumferential surface 34b of the recess 34. Thus, each elastic member 56 can air-tightly seal each cable lead-out hole 32.

In this embodiment, each of the cable clamps 54 is a ring-shaped member, and extends over the entire outer circumferential surface of the cable 14. Therefore, the front surface 70 of the cable clamp 54 is pressed against the back surface 80 of the elastic member 56 around the entire circumference of the cable 14.

Accordingly, the cable clamp 54 can press the elastic member 56 even in a region corresponding to the second hole part 66b of the flange 52, so it is possible to uniformly compress the elastic members 56 between the back wall 18 and the cable clamps 54. Due to this, it is possible to reliably seal the cable lead-out holes 32, thereby improve the air-tightness of the housing 12.

Further, according to this embodiment, since the cable holes 66 of the flange 52 have open ends 66c, the user can easily insert cables 14 from the open ends 66c into the cable holes 66. Therefore, it is possible to simplify the work of fastening the flange 52 to the housing 12.

Further, according to this embodiment, recesses 68 are formed at the front surface 60 of the flange 52, and the cable clamps 54 are received in the recesses 68. Due to this configuration, it is possible to suitably position the cable clamps 54 relative to the elastic members 56 when fastening the flange 52 to the back wall 18. As a result, it is possible to compress the elastic members 56 by the cable clamps 54 in a uniform and reliable manner.

Further, the user can arrange the flange 52 shown in FIG. 2 so as to reverse the front-rear thereof, and attach the flange 52 to the back wall 18 so that the back surface 62 of the flange 52 contacts the back surfaces 72 of the cable clamps 54. In this case, the forces by which the cable clamps 54 press the elastic members 56 change, thereby the air-tightness of the housing 12 also changes.

Thus, the user can change the air-tightness of the housing 12 only by changing the attachment direction (posture) of the flange 52. Therefore, it is possible to use common parts among a variety of apparatuses in which the requirements for air-tightness are different.

Note that, in the above-mentioned embodiment, a case is described where the cable clamp 54 is a single ring-shaped member. However, the cable clamp may be configured to be divided into a plurality of segments.

Figure 7:
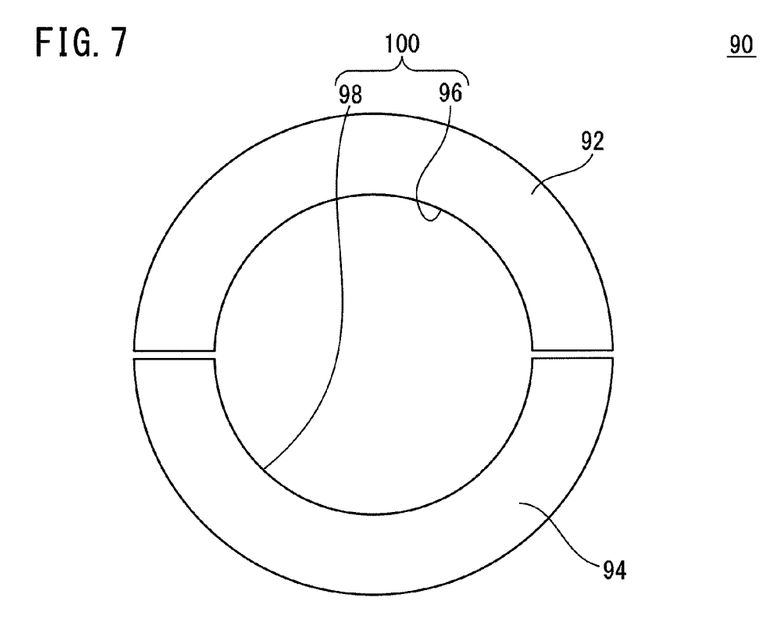
FIG. 7 is a view of a cable clamp according to another embodiment.

Examples of such cable clamp will be explained referring to FIG. 7 and FIG. 8. The cable clamp 90 shown in FIG. 7 is divided into two segments 92 and 94. Each of the segments 92 and 94 is a substantially C-shaped member. Specifically, the segments 92 and 94 respectively have semicircular inner circumferential surfaces 96 and 98.

When the segments 92 and 94 are assembled together as shown in FIG. 7, the inner circumferential surfaces 96 and 98 define a through hole 100 (first through hole) extending through the cable clamp 90. Thus, each of the inner circumferential surfaces 96 and 98 forms a part of the wall surface defining the through hole 100.

The cable clamp 90 can be arranged to be received in the recess 68 formed at the flange 52, similar as the above-mentioned cable clamp 54, while the cable 14 is inserted into the through hole 100.

Figure 8:
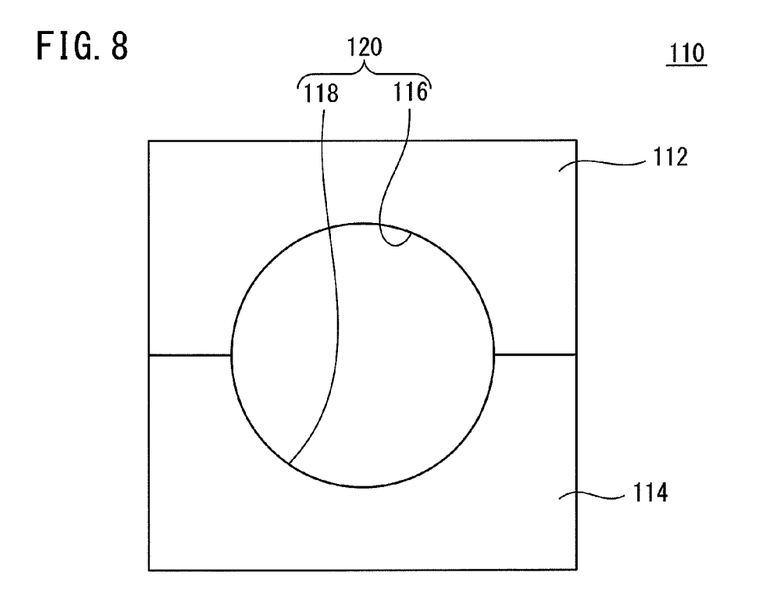
FIG. 8 is a view of a cable clamp according to still another embodiment.

The cable clamp 110 shown in FIG. 8 has a substantially square outer shape, and is divided into two segments 112 and 114. The segments 112 and 114 respectively have semicircular inner circumferential surfaces 116 and 118.

When the segments 112 and 114 are assembled with each other as shown in FIG. 8, the inner circumferential surfaces 116 and 118 define a through hole 120 (first through hole) extending through the cable clamp 110. Thus, each of the inner circumferential surfaces 116 and 118 forms a part of the wall surface defining the through hole 120.

When using the cable clamp 110, the recess 68 at the flange 52 may be formed into a square shape so as to correspond to the outer shape of the cable clamp 110. Then, the cable clamp 110 may be arranged to be received in the square-shaped recess 68 stated above, while the cable 14 is inserted into the through hole 120.

According to the cable clamps 90 and 110 shown in FIG. 7 and FIG. 8, since they can be divided into a plurality of segments, the cable clamps 90 and 110 can be attached to cables 14 after connecting the cables 14 to external device.

Figure 9:
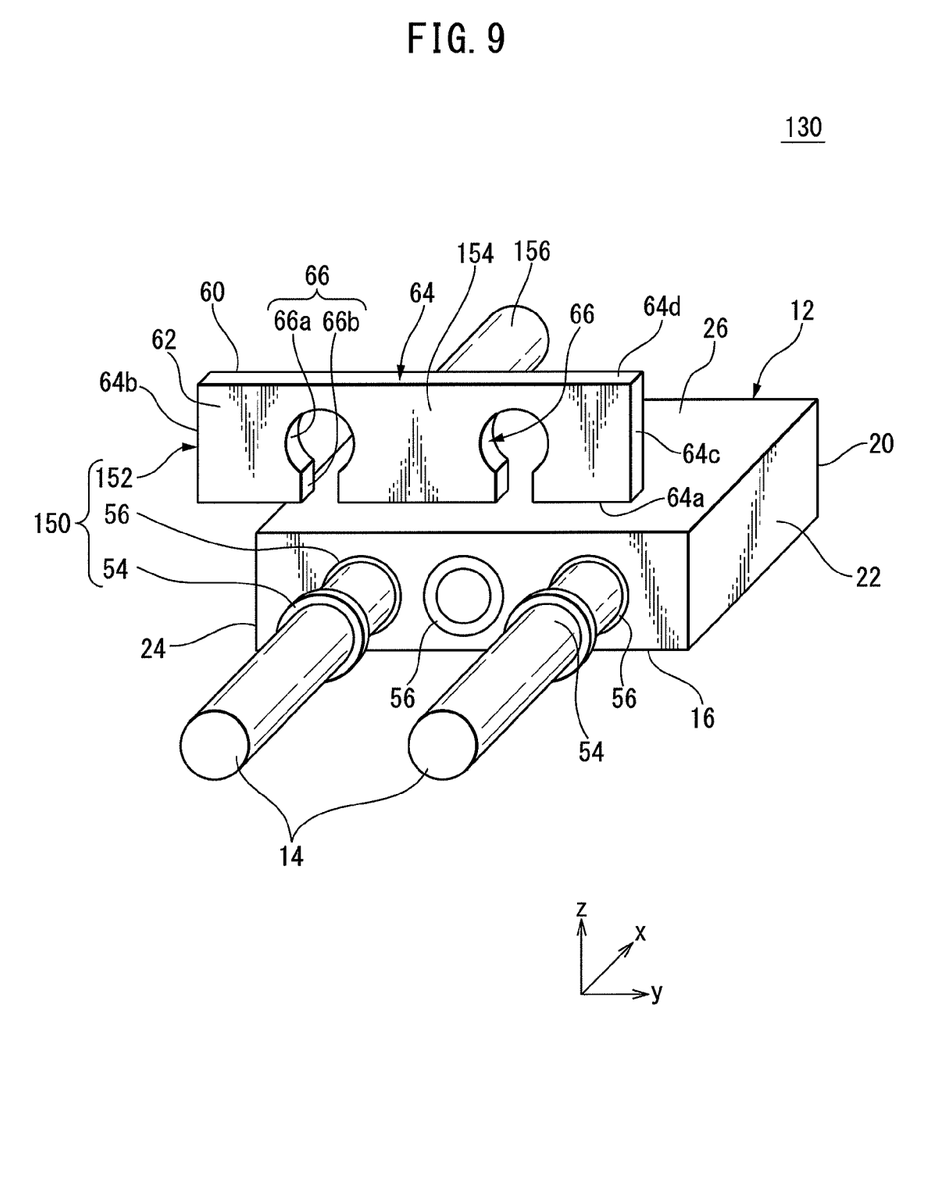
FIG. 9 is a disassembled view of an electronic device according to another embodiment of the invention.

Next, referring to FIG. 9 and FIG. 10, an electronic device 130 according to another embodiment will be explained. Note that, in various embodiments explained below, components similar to the already-mentioned embodiments will be assigned the same reference numerals, and detailed explanations thereof will be omitted. The electronic device 130 includes the housing 12, the electronic components (not shown) housed in the housing 12, the cables 14, and an apparatus 150.

In this embodiment, two cables 14 among a total of three cables 14 are led out through two cable lead-out holes 32 arranged at the left and right ends. On the other hand, no cable 14 is led out through the center cable lead-out hole 32, which is formed at the center in the left-right direction, out of a total of the three cable lead-out holes 32.

The apparatus 150 includes a flange 152, a total of two cable clamps 54, and a total of three elastic members 56. The flange 152 includes a main body 154 and a projection 156 which projects out from the main body 154.

The main body 154 is a substantially-rectangular plate member having the front surface 60, the back surface 62, the outer circumferential surface 64, and a total of two cable holes 66. Similar as the above-mentioned embodiment, each of the cable holes 66 is formed to be recessed upward from the bottom surface 64a of the main body 154 and extend from the front surface 60 to the back surface 62 of the main body 154.

The projection 156 is formed so as to project out from the front surface 60 of the main body 154 in the front direction. More specifically, the projection 156 includes a columnar-shaped first part 156a projecting frontward from the front surface 60 of the main body 154, and a columnar-shaped second part 156b projecting frontward from the front surface 156c of the first part 156a.

The first part 156a has an outer diameter larger than the second part 156b. As an example, the outer diameter and thickness in front-rear direction of the first part 156a are set to be substantially the same as the outer diameter and thickness in front-rear direction of the cable clamp 54, respectively. On the other hand, the second part 156b has a radius larger than the radius $R_5$ of the inner circumferential surface 82 of the elastic member 56 and smaller than the hole part 36 of the cable lead-out hole 32.

Figure 10:
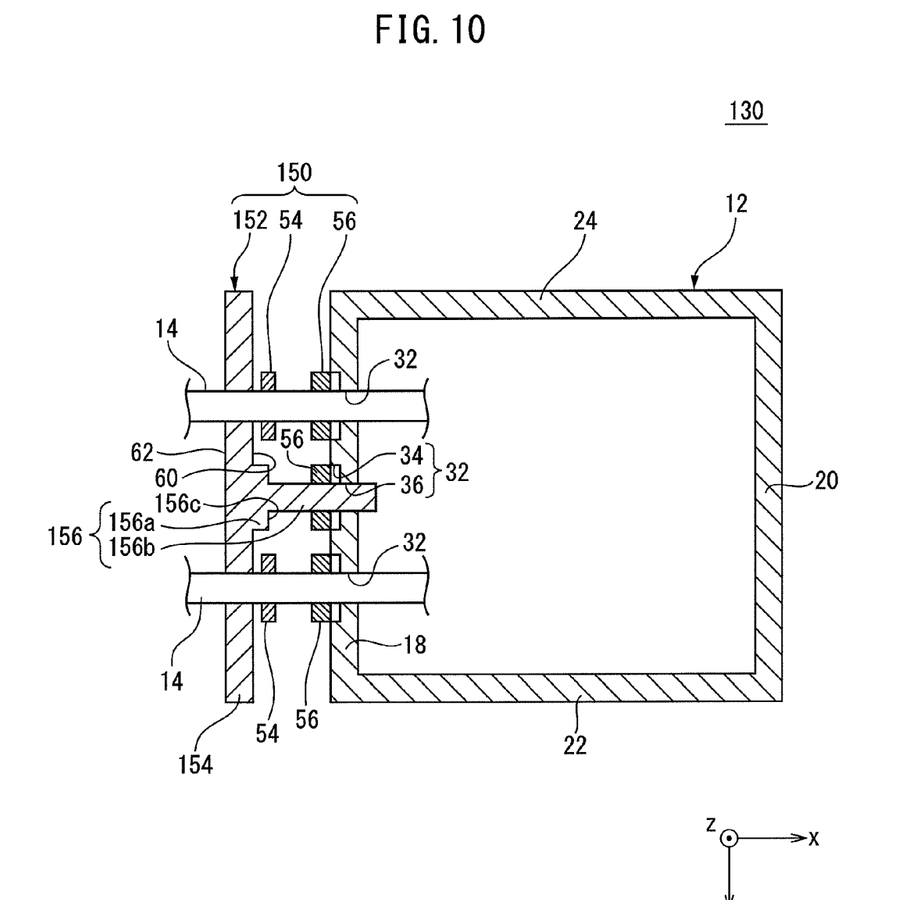
FIG. 10 is a cross-sectional view of the electronic device shown in FIG. 9 as seen from the upper side when cut along the x-z plane in FIG. 9.

When the flange 152 is fastened to the back wall 18 of the housing 12, as shown in FIG. 10, the second part 156b of the projection 156 is fit into the elastic member 56 and the cable lead-out hole 32 formed at the center in the left-right direction out of the total of three cable lead-out holes 32.

Further, the elastic member 56 is pressed by the front surface 156c of the first part 156a. As explained above, the first part 156a has the outer diameter and thickness in the front-rear direction substantially the same as the cable clamp 54.

According to this configuration, when the flange 152 is fastened to the back wall 18 of the housing 12, it is possible to make the forces for pressing three elastic members 56 to be substantially constant. In this way, the projection 156 can air-tightly close the cable lead-out hole 32 through which no cable 14 is led out.

According to the invention, the user can make use of common housing 12 in a variety of apparatuses by selectively using the above-mentioned flange 52 and flange 152 in accordance with the number of cables 14 led out from the housing 12. Due to this, it is possible to increase the variations of the apparatuses without increasing the number of parts.

Figure 11:
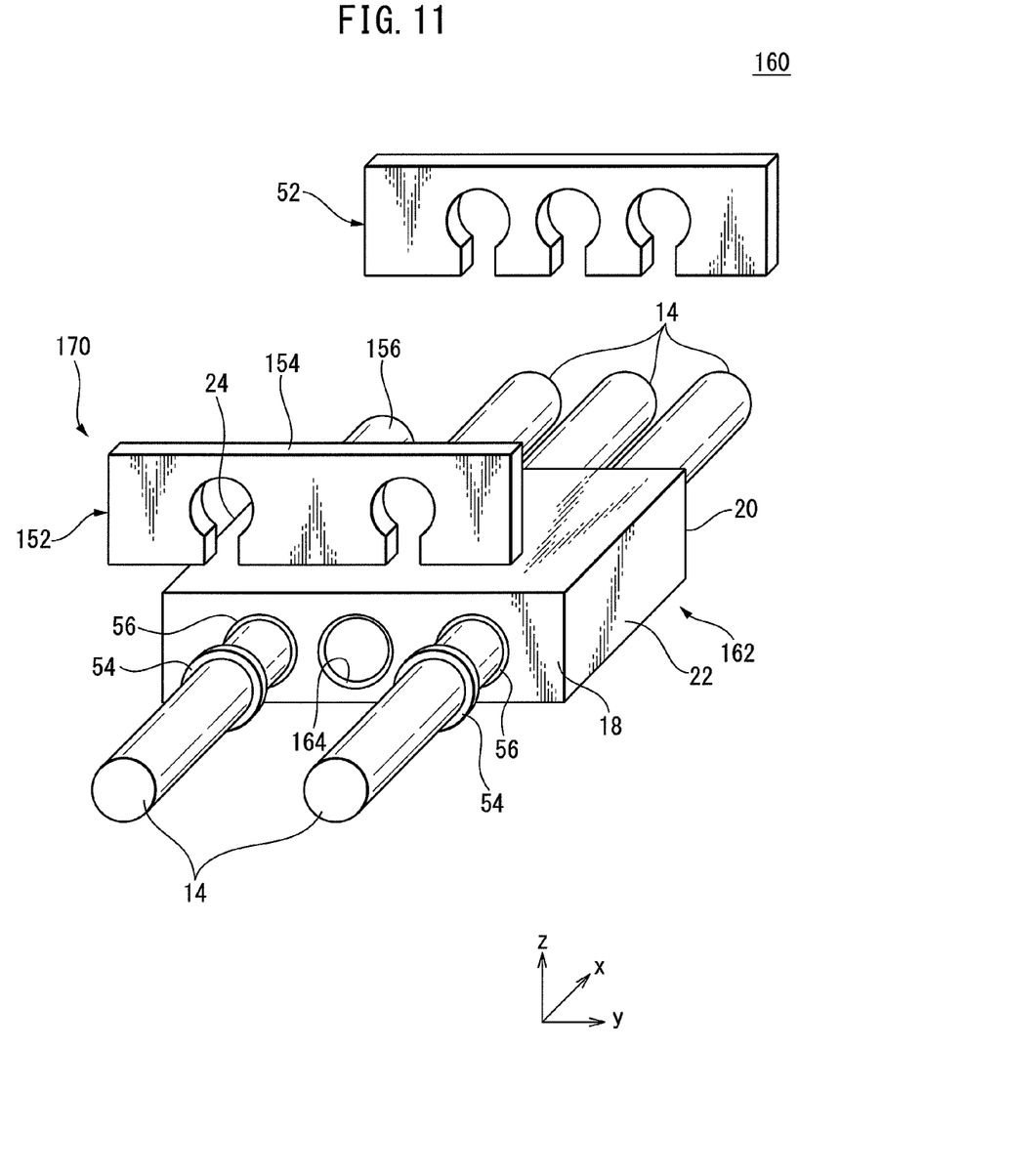
FIG. 11 is a disassembled view of an electronic device according to still another embodiment of the invention.
Figure 12:
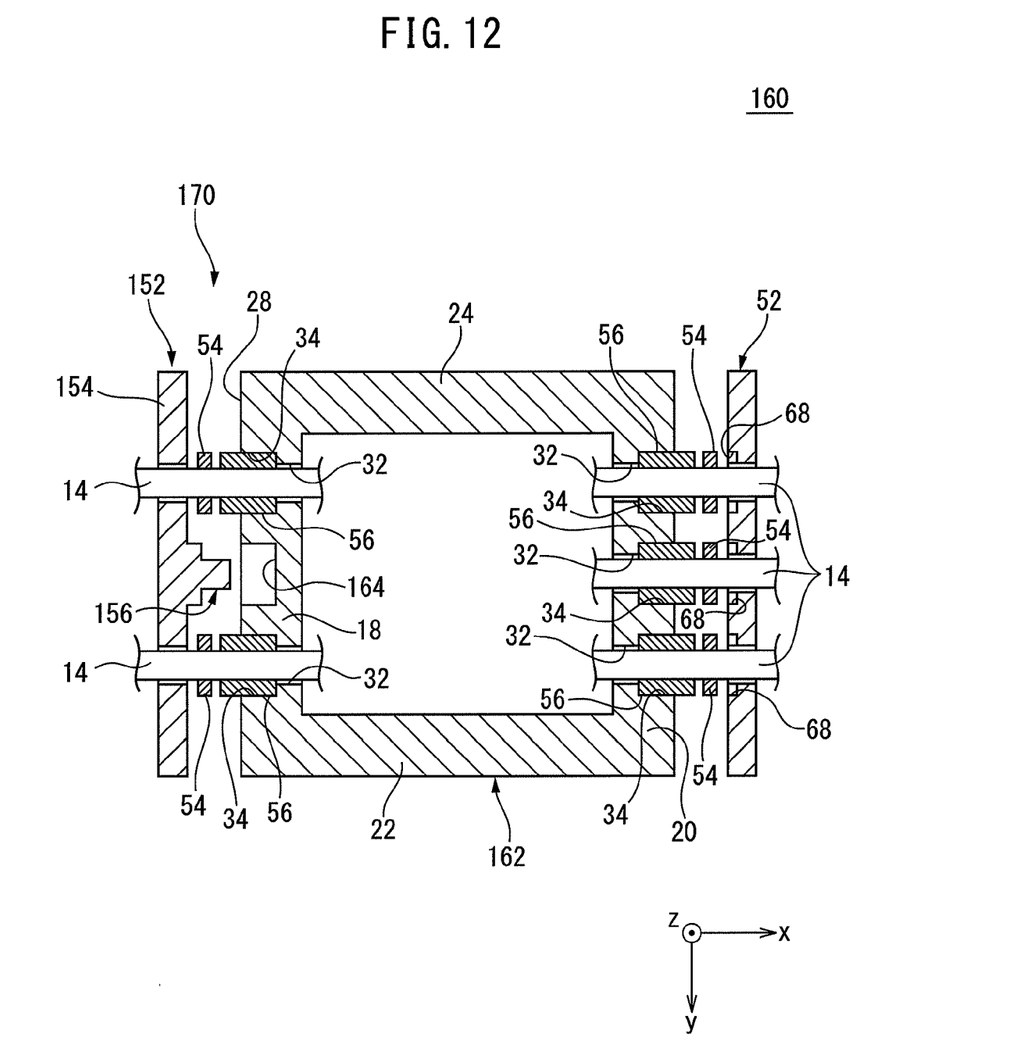
FIG. 12 is a cross-sectional view of the electronic device shown in FIG. 11 as seen from the upper side when cut along the x-z plane in FIG. 11.

Next, referring to FIG. 11 and FIG. 12, an electronic device 160 according to still another embodiment will be explained. The electronic device 160 includes a housing 162, the electronic components (not shown) housed in the housing 162, the cables 14, and an apparatus 170.

The housing 162 includes a total of two cable lead-out holes 32 formed at the back wall 18, and a total of three cable lead-out holes 32 formed at the front wall 20. Through these cable lead-out holes 32, a total of five cables 14 are led out from the inside of the housing 162 to the outside.

Further, the housing 162 further includes a hole 164 formed at the back wall 18. The hole 164 is formed to be recessed frontward from the back surface 28 of the back wall 18, and is arranged between two cable lead-out holes 32 formed at the back wall 18.

The apparatus 170 includes the flange 52, flange 152, a total of five cable clamps 54, and a total of five elastic members 56. The flange 52 is fastened to the front wall 20 of the housing 162. The recesses 68 formed at the flange 52 respectively receive the cable clamps 54 therein.

The recesses 34 of the cable lead-out holes 32 formed at the front wall 20 of the housing 162 respectively receive the elastic members 56 therein. When the flange 52 is fastened to the front wall 20, the elastic members 56 is pressed by the cable clamps 54, thereby the cable lead-out holes 32 formed at the front wall 20 can be sealed air-tightly.

On the other hand, the flange 152 is fastened to the back wall 18 of the housing 162. Two cable clamps 54 are arranged between the flange 152 and the back wall 18 of the housing 162, and two cables 14 led out toward rear side of the housing 162 are inserted into the cable clamps 54.

Each of the recesses 34 of the cable lead-out holes 32 formed at the back wall 18 of the housing 162 receives each of the elastic members 56 therein. The projection 156 of the flange 152 is fit into the hole 164 formed at the back wall 18.

Figure 13:
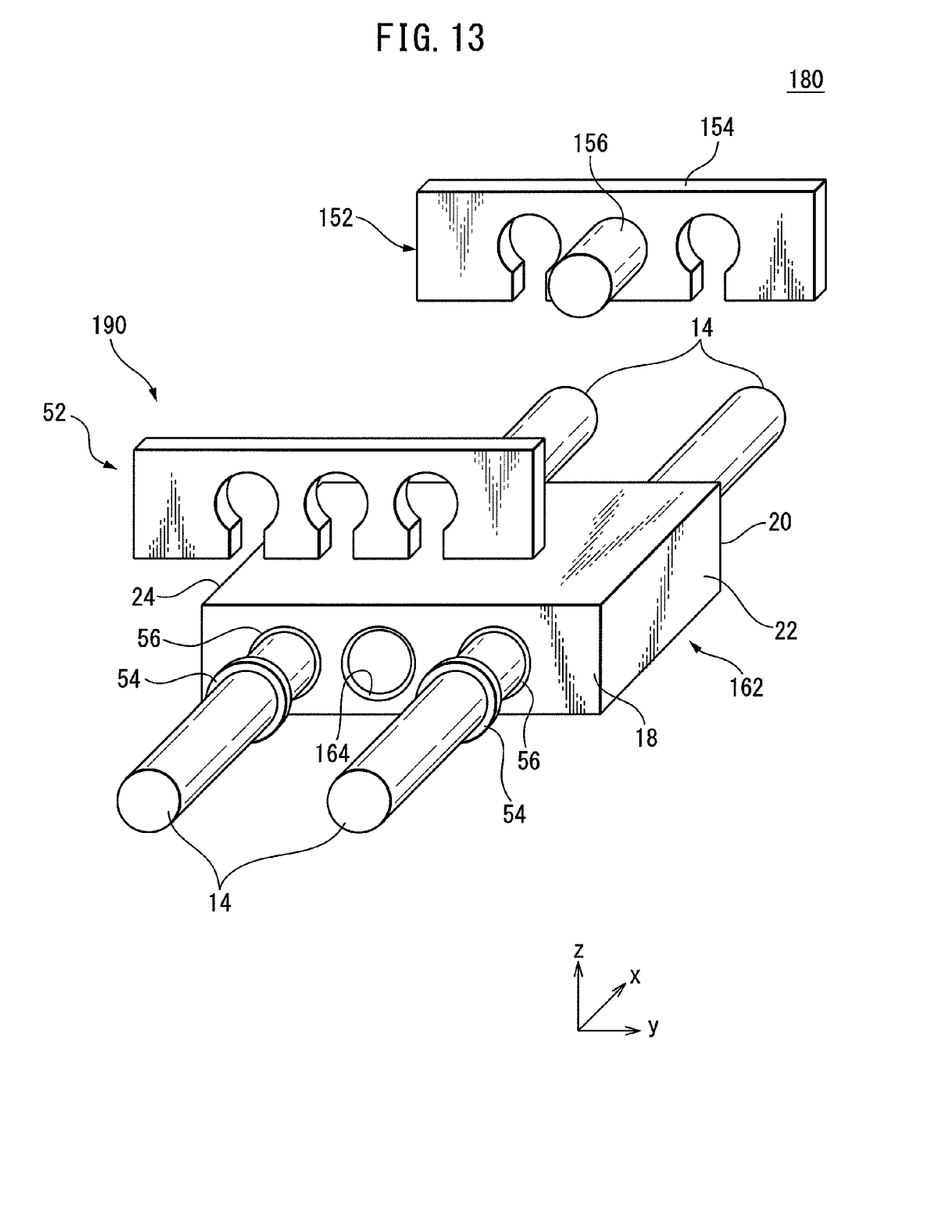
FIG. 13 is a disassembled view of an electronic device according to still another embodiment of the invention.
Figure 14:
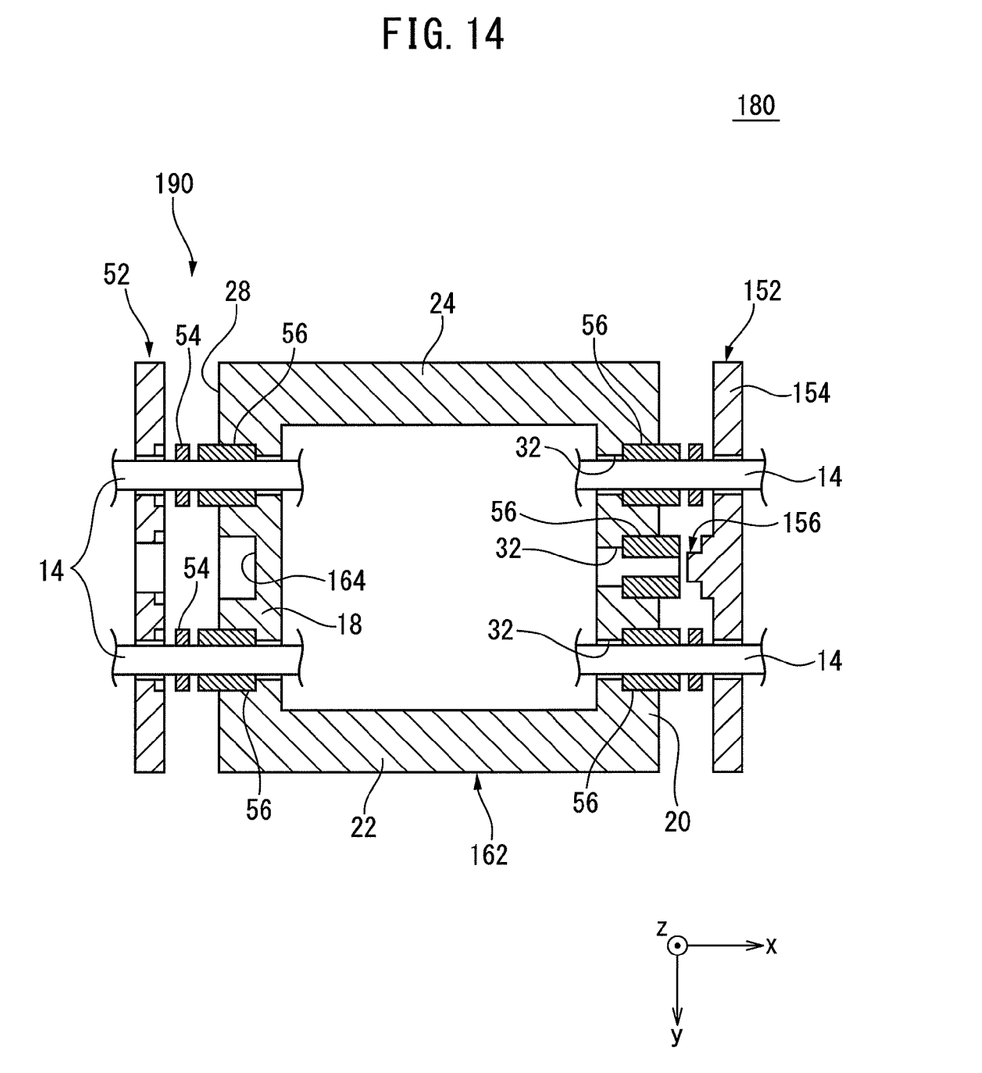
FIG. 14 is a cross-sectional view of the electronic device shown in FIG. 13 as seen from the upper side when cut along the x-z plane in FIG. 13.

Next, referring to FIG. 13 and FIG. 14, an electronic device 180 according to still another embodiment will be explained. The electronic device 180 includes the housing 162, electronic components (not shown) housed in the housing 162, cables 14, and an apparatus 190.

In this embodiment, a total of two cables 14 are led out toward front side of the housing 162 through two end cable lead-out holes 32, which are arranged at the left and right ends, out of the total of three cable lead-out holes 32 formed at the front wall 20 of the housing 162.

The apparatus 190 includes the flange 52, flange 152, a total of four cable clamps 54, and a total of five elastic members 56. The flange 52 is fastened to the back wall 18 of the housing 162.

On the other hand, the flange 152 is fastened to the front wall 20 of the housing 162, while the projection 156 of the flange 152 is fit into the cable lead-out hole 32, which is formed at the center in the left-right direction, out of the total of three cable lead-out holes 32 formed at the front wall 20. The projection 156 can seal the center cable lead-out hole 32.

As shown in FIG. 11 to FIG. 14, by combining two different types of the flanges 52, 152, it becomes possible to change the number of cables 14 to be led out from the housing 162, even after shipment of the electronic device.

More specifically, assume that it becomes necessary to reduce the number of cables 14 to be led out toward front side of the housing 162 from the electronic device 160 (i.e., "three") to the electronic device 180 (i.e., "two"). In this case, only by replacing the flange 52 with flange 152 in the electronic device 160, the user can seal the cable lead-out hole 32, through which the cable 14 is no longer led out, by the projection 156, as in the electronic device 180. Due to this, it becomes possible to flexibly deal with various variations of products.

Note that, in the above-mentioned embodiments, the flange 52 and the main body 154 of and flange 152 are substantially-rectangular plate members. However, the flange (or the main body) may be circular, elliptical, semi-spherical, or any other shape. In this case, the cable hole can be formed at the flange so as to open at the outer peripheral edge of the flange.

Further, in the above-mentioned embodiments, each cable hole 66 includes the first hole part 66a and second hole part 66b. However, the cable hole may have any configuration wherein the cable hole opens at the outer circumferential surface (outer peripheral edge) 64 of the flange 52 or main body 154, and receives the cable 14 therein. For example, the cable hole may be configured by a polygonal-shaped, semicircular-shaped, or elliptical-shaped cutout (notch) formed to be recessed from the outer peripheral edge of the flange.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, stages, and other processing in the apparatus and apparatus in the claims, specification, and drawings, unless particularly clearly indicated by "before", "in advance of", etc. or the output of prior processing being used for later'processing, can be realized in any order. In the flow of operations in the claims, specification, and drawings, even if explained using "first", "next", "then", etc. for convenience, this does not mean the execution in this order is essential.

The invention claimed is:

1. An apparatus for leading out a cable from a cable lead-out hole formed at a housing of an electronic device while sealing the cable lead-out hole, comprising:
 a flange fastened to the housing, and including:
  a first surface facing the housing;
  a second surface opposite the first surface;
 an outer circumferential surface extending between the first surface and the second surface and extending over the circumference of the flange;
  a cable hole including a first hole part which receives the cable and a second hole part extending from the first hole part so as to open at the outer circumferential surface of the flange; and
  a first recess formed to be recessed inward from an end face which faces the housing;
 a cable clamp received in the first recess so as to be arranged between the housing and the flange, and including a first through hole into which the cable is inserted, an end face of the cable clamp, which faces a bottom surface of the first recess, being in contact with the bottom face of the first recess;
 an elastic member arranged between the housing and the cable clamp, and including a second through hole into which the cable is inserted, wherein
 when the flange is fastened to the housing, the elastic member is sandwiched between the cable clamp and the housing, and elastically deforms so as to narrow the second through hole, thereby the elastic member holds the cable in the second through hole and seals the cable lead-out hole.

2. The apparatus according to claim 1, wherein the cable clamp is divided into a plurality of segments, wherein
 each of the plurality of segments has a surface which forms a part of a wall surface which defines the first through hole.

3. An electronic device comprising:
 a housing which houses an electronic component inside thereof and which includes a cable lead-out hole for leading out a cable; and
 an apparatus according to of claim 1 which is provided at the housing.

4. An apparatus for leading out a cable from a cable lead-out hole formed at a housing of an electronic device while sealing the cable lead-out hole, comprising:
 a flange fastened to the housing and including a cable hole which opens at an outer peripheral edge of the flange and which receives the cable,
 a cable clamp arranged between the housing and the flange, and including a first through hole into which the cable is inserted;
 an elastic member arranged between the housing and the cable clamp, and including a second through hole into which the cable is inserted, wherein
 when the flange is fastened to the housing, the elastic member is sandwiched between the cable clamp and the housing, and elastically deforms so as to narrow the second through hole, thereby the elastic member holds the cable in the second through hole and seals the cable lead-out hole
wherein the flange includes a projection projecting out from an end face which faces the housing toward the housing, wherein
 the projection is configured to be fit into a second cable lead-out hole when the flange is fastened to the housing, the second cable lead-out hole being formed at the housing so as to adjoin the cable lead-out hole.

5. An electronic device comprising:
 a housing which houses an electronic component inside thereof and which includes a cable lead-out hole for leading out a cable; and
 an apparatus for leading out the cable from the cable lead-out hole while sealing the cable lead-out hole, which is provided at the housing, the apparatus comprising:
 a flange fastened to the housing and including a cable hole which opens at an outer peripheral edge of the flange and which receives the cable,
 a cable clamp arranged between the housing and the flange, and including a first through hole into which the cable is inserted; and
 an elastic member arranged between the housing and the cable clamp, and including a second through hole into which the cable is inserted, wherein, when the flange is fastened to the housing, the elastic member is sandwiched between the cable clamp and the housing, and elastically deforms so as to narrow the second through hole, thereby the elastic member holds the cable in the second through hole and seals the cable lead-out hole,
 wherein the cable lead-out hole includes:
 a second recess formed to be recessed inward of the housing from a first end face of the housing which faces the flange; and
 a hole part extending from a bottom surface of the second recess to a second end face of the housing opposite the first end face,
 wherein the elastic member is received in the second recess.

* * * * *